United States Patent
Li et al.

(10) Patent No.: US 6,680,827 B2
(45) Date of Patent: Jan. 20, 2004

(54) DUAL SPIN VALVE CPP MR WITH FLUX GUIDE BETWEEN FREE LAYERS THEREOF

(75) Inventors: Shuxiang Li, Saku (JP); Satoru Araki, Saku (JP)

(73) Assignee: TDK Corporation, Tokyo (JP)

(*) Notice: Subject to any disclaimer, the term of this patent is extended or adjusted under 35 U.S.C. 154(b) by 206 days.

(21) Appl. No.: 09/729,719

(22) Filed: Dec. 6, 2000

(65) Prior Publication Data

US 2002/0067580 A1 Jun. 6, 2002

Related U.S. Application Data (60) Provisional application No. 60/223,321, filed on Aug. 7, 2000.

(51) Int. Cl.[7] .................................................. G11B 5/39
(52) U.S. Cl. .................. 360/314; 360/321; 360/324.12; 360/324.2
(58) Field of Search .......................... 360/321, 324.12, 360/324.2, 319, 314

(56) References Cited

U.S. PATENT DOCUMENTS

| | | |
|---|---|---|
| 5,287,238 A | 2/1994 | Baumgart et al. |
| 5,627,704 A | 5/1997 | Lederman et al. |
| 5,668,688 A | 9/1997 | Dykes et al. |
| 5,856,897 A | 1/1999 | Mauri |
| 5,896,252 A * | 4/1999 | Kanai |
| 5,898,547 A * | 4/1999 | Fontana, Jr. et al. |
| 5,930,087 A * | 7/1999 | Brug et al. |
| 6,154,349 A * | 11/2000 | Kanai et al. ............ 360/324.12 |
| 6,178,074 B1 * | 1/2001 | Gill .......................... 360/324.2 |
| 6,219,212 B1 * | 4/2001 | Gill et al. ................. 360/324.2 |
| 6,344,954 B1 * | 2/2002 | Redon et al. ............ 360/324.2 |

FOREIGN PATENT DOCUMENTS

JP          5-275769          10/1993

OTHER PUBLICATIONS

Dauguet et al., "Angular Dependence of the Perpendicular Giant Magnetoresistance of Multilayers", 1996 The American Physical Society, vol. 54, No. 2, pp. 1083–1087 (Jul. 1, 1996–II).
Baibich et al., "Giant Magnetoresistance of (001) Fe/(001)Cr Magnetic Superlattices", Physical Review Letters, 1988 The American Physical Society, vol. 61, No. 21, pp. 2472–2475 (Nov. 21, 1988).
Dieny et al., "Giant Magnetorestistance in Soft Ferromagnetic Multilayers", Physical Review B, 1991 The American Physical Society, vol. 43, No. 1, pp. 1297–1300 (Jan. 1, 1991).
Pratt et al., Perpendicular Giant Magnetoresistances of Ag/Co Multilayers, Physical Review Letters, 1991 The American Physical Society, vol. 66, No. 23, pp. 3060–3063 (Jun. 10, 1991).

* cited by examiner

*Primary Examiner*—Craig A. Renner
(74) *Attorney, Agent, or Firm*—Morgan, Lewis & Bockius LLP (57) ABSTRACT

A current perpendicular-to-the-plane magnetoresistance (CPP-MR) device includes a first magnetic shield, a second magnetic shield, and a spin valve structure. The first and second magnetic shields are formed of an electrically conductive and magnetically shielding material. A read gap is defined between the first and second magnetic shields, and the spin valve structure is disposed between the first and second magnetic shields. The spin valve structure is electrically connected and magnetically separated from the first and second magnetic shields such that the first and second magnetic shields act as electrical contact leads.

3 Claims, 8 Drawing Sheets

DUAL SPIN VALVE CPP MR WITH FLUX GUIDE BETWEEN FREE LAYERS THEREOF

This application claims the benefit of a provisional application, which was filed on Aug. 7, 2000 and assigned Provisional Application No. 60/223,321, which is hereby incorporated by reference.

BACKGROUND OF INVENTION

1. Field of the Invention

The present invention relates generally to a giant magnetoresistance device, and more particularly, to a current perpendicular-to-the-plane magnetoresistance (CPP-MR) head for reading magnetic signals from a magnetic medium.

2. Description of the Related Art

Giant magnetoresistance (GMR) was first described by Baibich et al. [Phys. Rev. Lett. 61, 2472 (1988)]. The discovery of GMR triggered numerous studies on the transport properties of magnetic multilayers. In most cases, the current flows in the plane of the layers and is known as current-in-the-plane magnetoresistance (CIP-MR).

Pratt et al. extended the GMR studies to the case where the current flows perpendicular to the plane, thereby causing current-perpendicular-to-the-plane magnetoresistance (CPP-MR). [See, for example, Phys. Rev. Lett. 66, 3060 (1991).] In general, signals caused by CPP-MR are several times larger than those caused by CIP-MR.

The physical origin for both CIP-MR and CPP-MR is that the application of an external field causes a variation in the relative orientation of the magnetizations of neighboring ferromagnetic layers. This variation causes a change in the spin-dependent scattering of conduction electrons and, therefore, the electrical resistance of the structure. In a multi-layer structure having a configuration of [ferromagnetic/nonmagnetic]n, the GMR amplitude oscillates with variations in the nonmagnetic layer thickness due to the oscillation of coupling between neighboring ferromagnetic layers that orients the magnetizations of neighboring ferromagnetic layers antiparallel or parallel. In general, the oscillation period is about 12 angstroms—slightly depending on the nonmagnetic material. Thus, fluctuation and uniformity of the nonmagnetic layer thickness cause a dispersion of the coupling between the neighboring ferromagnetic layers. However, the antiparallel configuration, for example, between the magnetizations of neighboring ferromagnetic layers are not perfect, thereby reducing the GMR amplitude from the ideal situation.

The reduction in GMR amplitude may be minimized or eliminated using a spin valve structure as described by B. Dieny et al. in Phys. Rev. B43, 1297 (1991). A standard spin valve comprises two ferromagnetic layers separated by a nonmagnetic spacer such as Cu. The magnetization of one ferromagnetic layer is fixed by an adjacent antiferromagnetic layer or permanent magnetic layer, thereby preventing rotation in the presence of the field of interest. As a result, there is only one possible orientation for the magnetization of this ferromagnetic layer. The magnetization of the other ferromagnetic layer is not fixed and can freely rotate in the presence of an external field.

U.S. Pat. No. 5,668,688 to Dykes et al. (which is hereby incorporated by reference) describes a CPP spin valve type magnetoresistance transducer. However, for ultra high areal density (i.e., over 100 Gbit per square inch) applications, there are at least two limitations that result from the arrangement disclosed in Dykes et al. First, the read gap in that arrangement is limited by the spin valve thickness. Second, due to the current perpendicular-to-the-plane model, the magnetoresistance of this spin valve structure is insufficient for ultrahigh areal density applications.

SUMMARY OF THE INVENTION

Accordingly, the present invention is directed to a current perpendicular-to-the-plane magnetoresistance head that substantially obviates one or more of the problems due to limitations and disadvantages of the related art.

An object of the present invention is to provide a magnetoresistance device having a small read gap.

Another object of the present invention is to provide a magnetoresistance device having a read gap that is not limited by a spin valve thickness.

Another object of the present invention is to provide a magnetoresistance device that achieves an ultrahigh areal density.

Another object of the present invention is to provide a magnetoresistance device having a high output.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a current perpendicular-to-the-plane magnetoresistance (CPP-MR) device includes a first magnetic shield formed of an electrically conductive and magnetically shielding material; a second magnetic shield formed of an electrically conductive and magnetically shielding material, the first and the second magnetic shield disposed to define a read gap therebetween; and a spin valve structure disposed between the first and second magnetic shields, the spin valve structure being electrically connected and magnetically separated from the first and second magnetic shields such that the first and second magnetic shields act as electrical contact leads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

By way of overview, the present invention provides a giant magnetoresistance device arrangement for use in the general technical field of the read head arrangement as described in detail in a copending U.S. Patent Application filed on Jul. 20, 2000, entitled "MAGNETIC TUNNEL JUNCTION READ HEAD USING A HYBRID, LOW-MAGNETIZATION FLUX GUIDE" to Olivier Redon et al., along with its corresponding U.S. Provisional Application No. 60/192,320, filed on Mar. 27, 2000, which are herein expressly incorporated by reference.

Reference will now be made in detail to the preferred embodiments of the present invention, examples of which are illustrated in the accompanying drawings.

The magnetoresistance device according to the present invention comprises a pair of magnetic shields that also serve as electrical contact leads to carry sense current flowing perpendicular-to-the-plane of the magnetoresistance device. In one embodiment, the device uses flux guide spin valve type CPP/MR heads. In another embodiment, the magnetoresistance device uses a flux guide type dual spin valve structure. Thus, the magnetoresistance device according to the present invention can provide a small read gap and greater magnetoresistance over prior arrangements, thereby enabling ultrahigh areal density.

Figure 1:
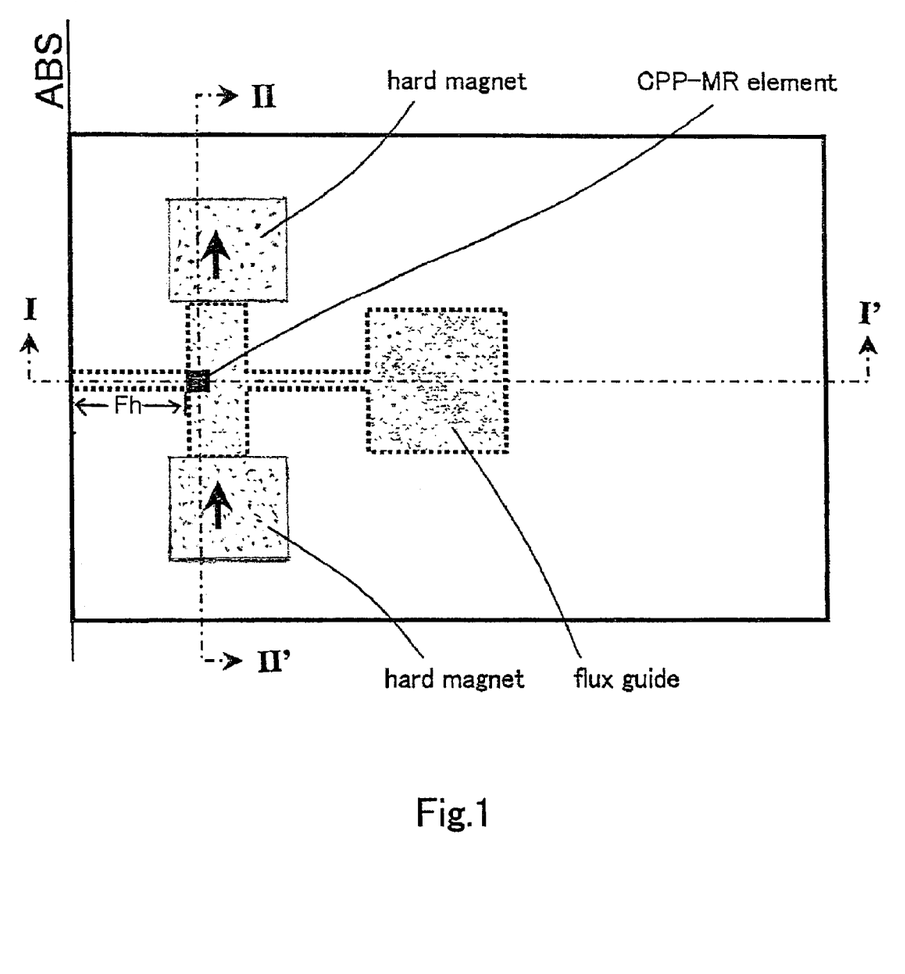
FIG. 1 is a schematic top view of the embodiment of a CPP-MR head of the present invention.

FIG. 1 shows a top view of an embodiment of a current perpendicular-to-the-plane MR head configuration. The GMR element, which may also be referred to as a CPP-MR element, (represented by the small dark square) is placed between two magnetic shields that are also used as electrical contact leads. A flux guide is magnetically connected with the GMR element and also one of the two magnetic shields. The free layer of the GMR element is wider than a pinned layer of the GMR element. A longitudinal magnetic bias is provided by abutted permanent magnets by initializing the permanent magnets in the direction represented by the arrows of FIG. 1. The flux guide is made of low magnetic moment soft materials preferably having the composition NiFeX (wherein X is Cr, Ta, Nb, Zr, or Mo). The shields may comprise CoZrNb, CoZrTa, or NiFeX (wherein X is Cr, Ta, Nb, Zr, or Mo). The permanent magnets used for providing a magnetic bias may be made of, for example, Co-αFe$_2$O$_3$, CoPt, CoCrPt, or CoCrTaPt together with an underlayer made of, for example, Cr, Ta, or CrTa.

The flux guide includes a front portion and a back portion. As shown in FIG. 1, the front portion of the flux guide has a height that extends along a length Fh from a front of the GMR element to a sensing surface. This sensing surface, as shown in FIG. 1, is a head end surface, i.e., an ABS (Air Bearing Surface), which confronts a magnetic recording medium. The height of the front portion Fh of the flux guide is preferably less than 0.1 μm. The remainder of the flux guide is wider than the pinned layer of GMR element. The back portion of the flux guide represented by the large square is preferably magnetically connected with one of the first and second magnetic shields of the magnetoresistance device.

The top view of the GMR element shown in FIG. 1 corresponds to the three exemplary embodiments shown in FIGS. 2a–4b. In the first embodiment of FIGS. 2a–2b, a top type spin valve is used as the GMR element. In the second embodiment of FIGS. 3a–3b, a bottom type spin valve is used as the GMR element. In the third embodiment of FIGS. 4a–4b, a dual spin valve is used as the GMR element.

Figure 2A:
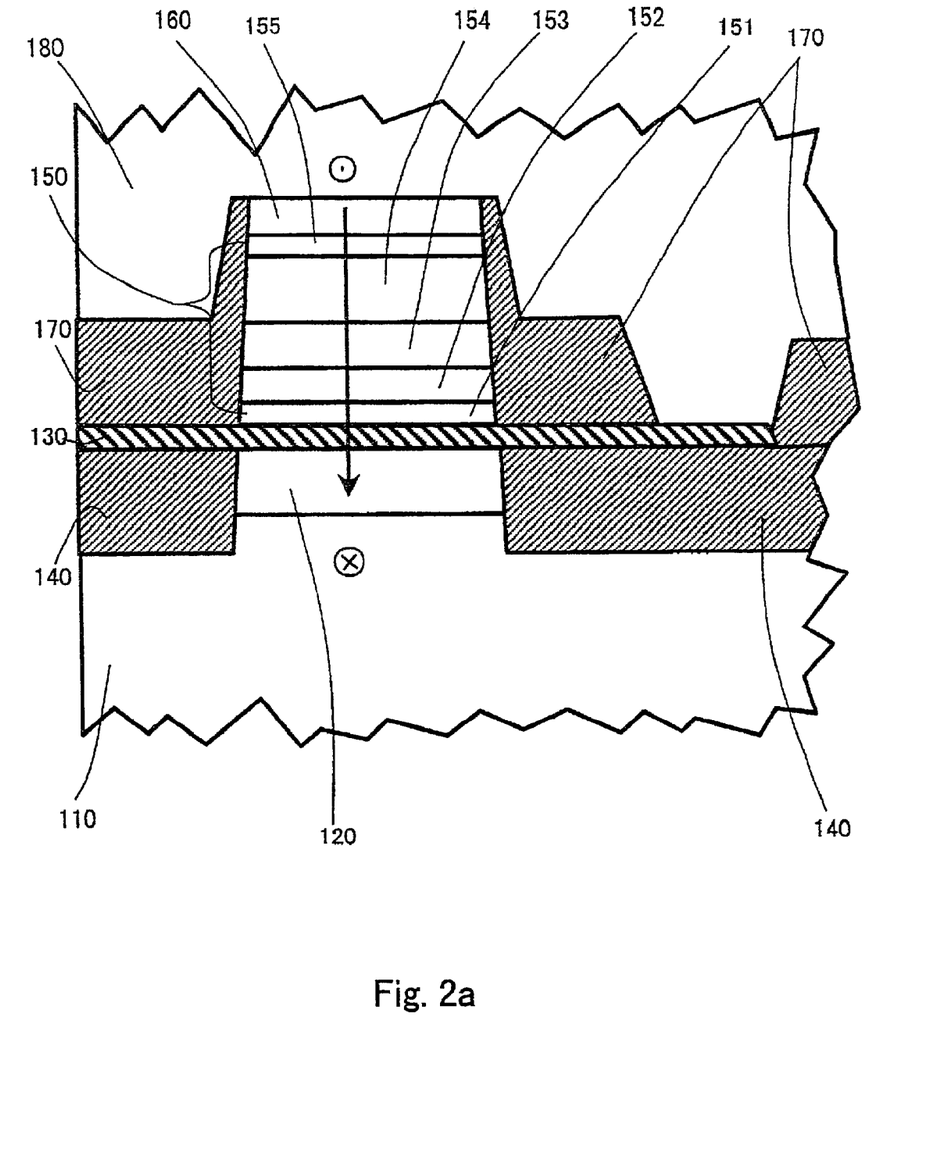
FIG. 2a is a schematic cross-sectional view along line I–I' of FIG. 1 showing a first embodiment of the CPP-MR head of the present invention.

FIG. 2a shows a schematic cross-sectional view along line I–I' of FIG. 1 according to a first embodiment. A top type spin valve 150 is used as the GMR element. The spin valve 150 comprises a free ferromagnetic layer 151, a spacer layer 152 made, for example, of Cu or Ag, a pinned layer 153, an antiferromagnetic pinning layer 154 made, for example, of Mn-based alloys such as PtMn, PtPdMn and IrMn, and a cap layer 155 made, for example, of Ta. The pinned layer 153 may be a single layer made of, for example, Co, CoFe, CoFeB. Alternatively, the pinned layer 153 may be a synthetic pinned layer that comprises two ferromagnetic layers made of, for example, Co, CoFe, or CoFeB that are antiferromagnetically coupled through a thin spacer layer made of, for example, Ru or Re. The free ferromagnetic layer 151 may comprise of, for example, NiFe, NiFeCo, Co, CoFe, CoFeB, or NiFeX (wherein X is Cr, Ta, Nb, Zr, or Mo).

A flux guide 130 directly contacts the free layer 151 of the spin valve structure. Thus, the flux guide 130 is part of the free ferromagnetic layer of the spin valve 150. In order to enforce the flux guide efficiency, the flux guide 130 also magnetically contacts one of the two shields 110 and 180. In the illustrated case of FIGS. 2a–2b, the flux guide 130 magnetically contacts top shield 180. The spin valve 150 and flux guide 130 are then electrically connected with bottom shield 110 and top shield 180 through two nonmagnetic conductors 120 and 160. The electrical conductors 120 and 160 may be made of Cu, Ag, Au, or α-Ta. The two magnetic shields 110 and 180 are separated from each other by oxide layers 140 and 170 which, for example, are made of Al$_2$O$_3$ or SiO$_2$. In accordance with the configuration of the device of FIG. 2a, the sense current carried by the two shields 110 and 180 can pass through the GMR element according to the current perpendicular-to-the-plane model, as represented by the arrow in FIG. 2a.

Figure 2B:
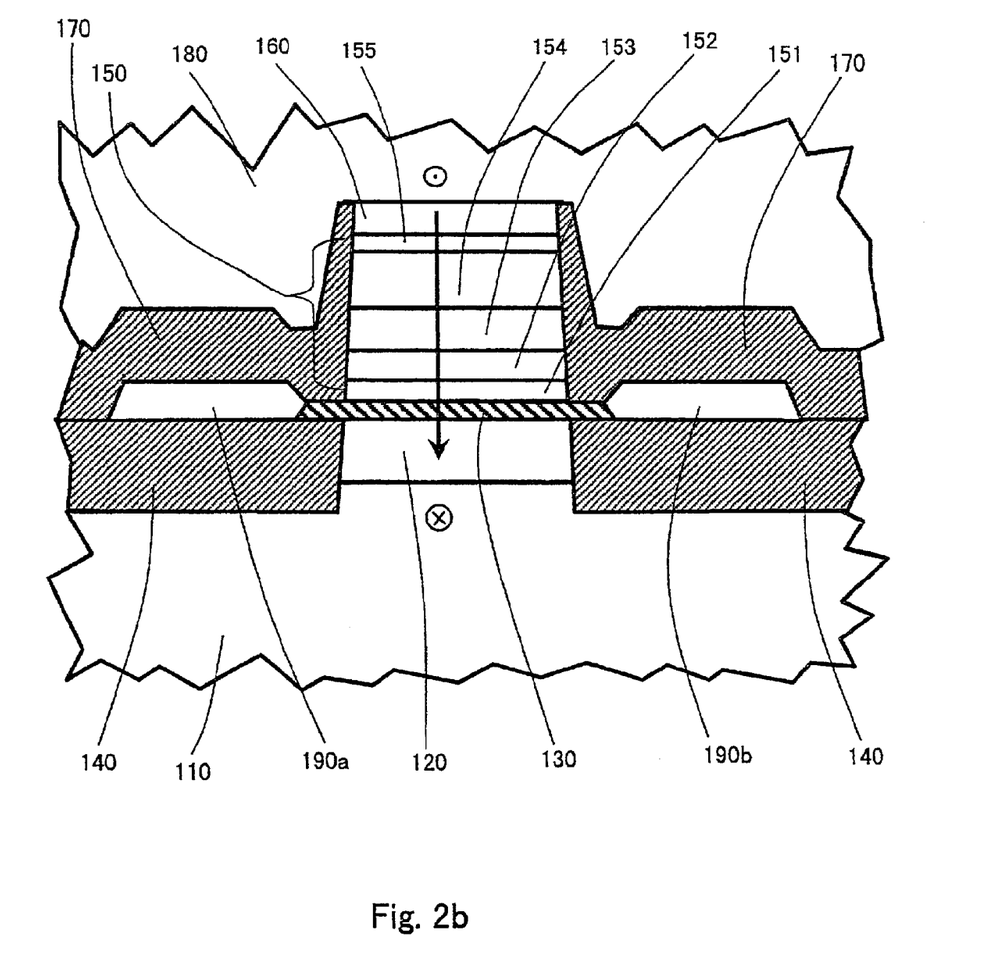
FIG. 2b is a schematic cross-sectional view along line II–II' of FIG. 1 showing the first embodiment of CPP-MR head of the present invention.

FIG. 2b shows a schematic cross-sectional view along line II–II' of FIG. 1 for the first embodiment of the present invention. As shown, a magnetic bias is provided by permanent magnets 190a and 190b. The flux guide 130 or the free ferromagnetic layer 151 of the spin valve 150 is wider than other layers of the spin valve structure. The permanent magnets 190a and 190b abut the flux guide layer 130, thereby suppressing Barkhausen noise and achieving improved linearity of the GMR element.

Figure 3A:
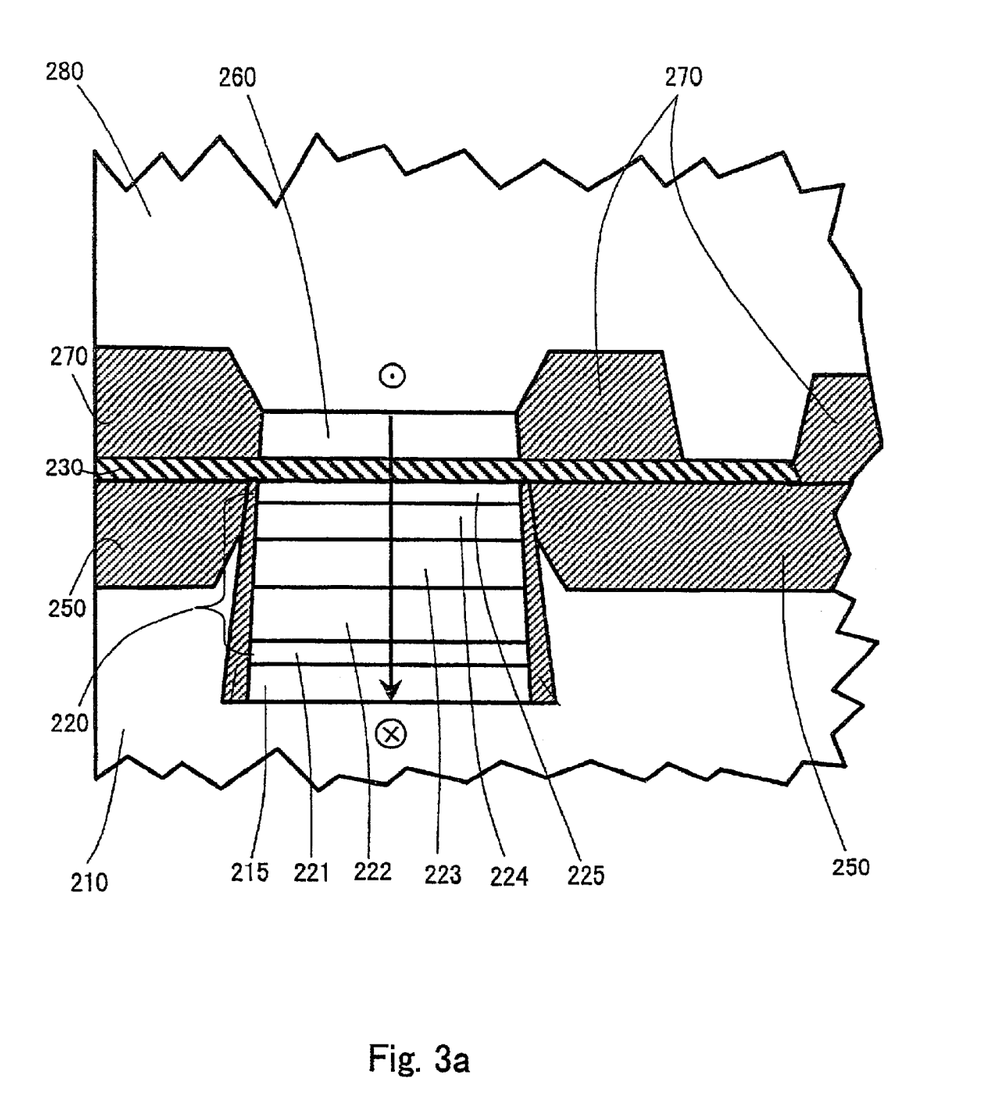
FIG. 3a is a schematic cross-sectional view along line I–I' showing a second embodiment of the CPP-MR head of the present invention.

FIG. 3a shows a schematic cross-sectional view along line I–I' of FIG. 1 according to a second embodiment. A bottom type spin valve 220 is used as the GMR element. The spin valve 220 comprises an underlayer 221 made, for example, of Ta, NiCr or NiFeCr, an antiferromagnetic pinning layer 222 made, for example, of Mn-based alloys such as PtMn, PtPd or IrMn, a pinned layer 223, a spacer layer 224 made, for example, of Cu or Ag, and a free ferromagnetic layer 225. The pinned layer 223 may be a single layer made of, for example, Co, CoFe, or CoFeB. Alternatively, the pinned layer 223 may be a synthetic pinned layer that comprises two ferromagnetic layers made of, for example, Co, CoFe, or CoFeB that are antiferromagnetically coupled through a thin spacer layer made of, for example, Ru or Re. The free ferromagnetic layer 225 may comprise NiFe, NiFeCo, Co, CoFe, CoFeB, or NiFeX (wherein X is Cr, Ta, Nb, Zr, or Mo).

A flux guide 230 directly contacts the free layer 225 of the spin valve structure. Thus, the flux guide 230 is part of the free ferromagnetic layer 225 of the spin valve 220. In order to maintain flux guide efficiency, the flux guide 230 also magnetically contacts one of the two shields 210 and 280. In the illustrated configuration of FIG. 3a, the flux guide 230 magnetically contacts top shield 280. The spin valve 220 and flux guide 230 are further electrically connected with bottom shield 210 and top shield 280 through two nonmagnetic electrical conductors 215 and 260. The electrical conductors 215 and 260 may be made of Cu, Ag, Au, or α-Ta. The two magnetic shields are separated from each other by oxide layers 250 and 270 made, for example, of $Al_2O_3$ or $SiO_2$. In accordance with the structure of FIG. 3a, the sense current carried by the two shields 210 and 280 pass through the GMR element with current perpendicular-to-the-plane model, as represented by the arrow in FIG. 3a.

Figure 3B:
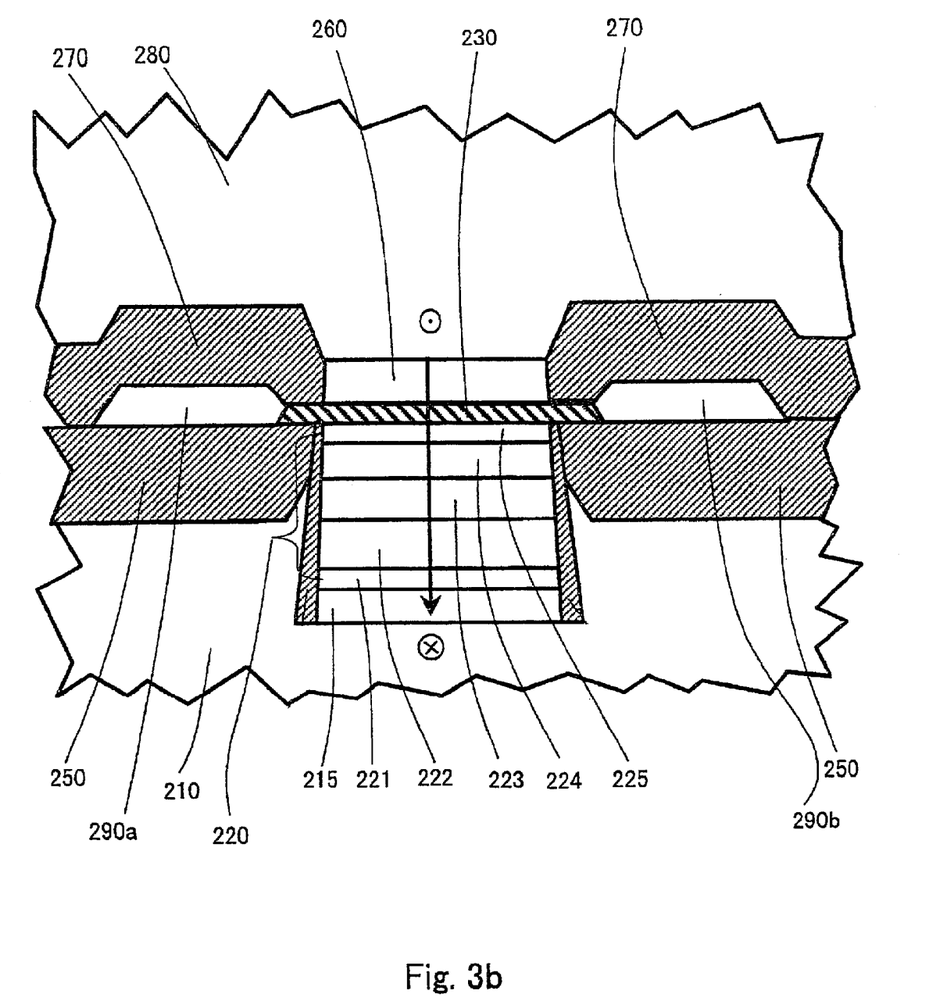
FIG. 3b is a schematic cross-sectional view along line II–II' showing the second embodiment of the CPP-MR head of the present invention.

FIG. 3b shows a schematic cross-sectional view along line II–II' of FIG. 1 for the second embodiment. FIG. 3b shows the magnetic bias provided by permanent magnets 290a and 290b. The flux guide 230 or the free ferromagnetic layer 225 of the spin valve 220 is wider than other layers of the spin valve structure. The permanent magnets 290a and 290b abut the flux guide layer 230, thereby suppressing Barkhausen noise and achieving improved linearity of the GMR element.

Figure 4A:
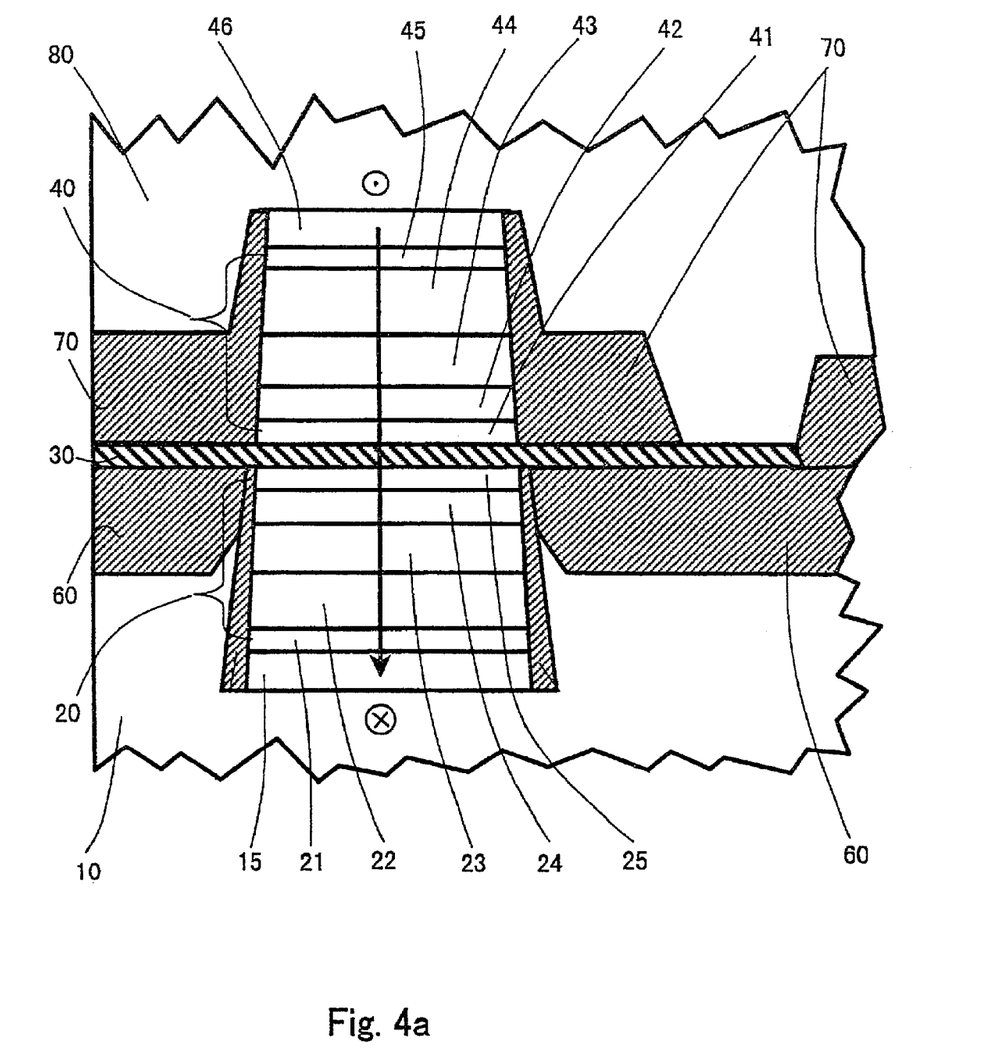
FIG. 4a is a schematic cross-sectional view along line I–I' showing a third embodiment of the CPP-MR head of the present invention.

FIG. 4a shows a schematic cross-sectional view along line I–I' of FIG. 1 for a third embodiment. A dual spin valve, including two spin valves 20 and 40 facing each other, is used as the GMR element. The spin valve 20 is a bottom type spin valve comprising an underlayer 21 made, for example, of Ta, NiCr or NiFeCr, an antiferromagnetic pinning layer 22 made, for example, of Debased alloys such as Pt, PtPdMn and IrMn, a pinned layer 23, a spacer layer 24 made, for example, of Cu or Ag, and a free ferromagnetic layer 25. The spin valve 40 is a top type spin valve comprising a free ferromagnetic layer 41, a spacer layer 42 made, for example, of Cu or Ag, a pinned layer 43, an antiferromagnetic pinning layer 44 made, for example, of Mn-based alloys such as PtMn, PtPdMn and IrMn, and a cap layer 45 made, for example, of Ta.

The pinned layers 23 and 43 may be a single layer made of Co, CoFe, or CoFeB. Alternatively, the pinned layers 23 and 43 may be a synthetic pinned layer that comprises two ferromagnetic layers made, for example, of Co, CoFe or CoFeB that are antiferromagnetically coupled through a thin spacer layer made, for example, of Ru or Re. The thin spacer layer preferably has a thickness of less than 10 angstroms. The free ferromagnetic layers 25 and 41 may comprise, for example, NiFe, NiFeCo, Co, CoFe, CoFeB, or NiFeX (wherein X is Cr, Ta, Nb, Zr, or Mo). A flux guide 30 directly contacts the two free layers 25 and 41 of the two spin valves. Thus, the flux guide 30 is part of the free ferromagnetic layers 25 and 41 of the two spin valves 20 and 40. In order to maintain flux guide efficiency, the flux guide 30 magnetically contacts one of the two shields 10 and 80. In the illustrated configuration of FIG. 4a, the flux guide 30 contacts the top shield 80.

The spin valve 20, flux guide 30, and spin valve 40 are electrically connected in series and then electrically connected with bottom shield 10 and top shield 80 through two nonmagnetic electrical conductors 15 and 46. The electrical conductors 15 and 46 may be made of, for example, Cu, Ag, Au, or α-Ta. The two magnetic shields 10 and 80 are separated from each other by oxide layers 60 and 70 that may be made of, for example, $Al_2O_3$ or $SiO_2$. In accordance with the configuration of FIG. 4a, the sense current carried by the two shields 10 and 80 can pass through the GMR element according to the current perpendicular-to-the-plane model, as represented by the vertical arrow in FIG. 4a. As a result of this dual spin valve configuration, an even higher output can be achieved as compared with the output achieved with the first and second embodiments discussed above.

Figure 4B:
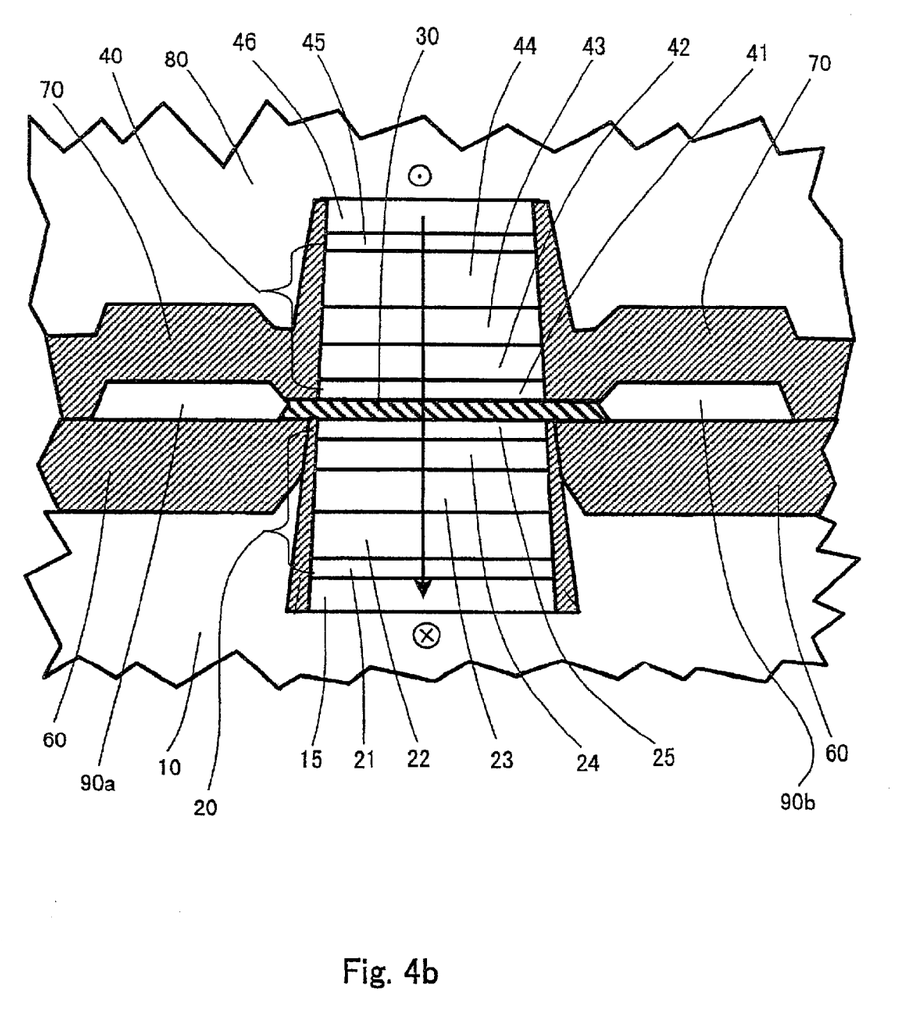
FIG. 4b is a schematic cross-sectional view along line II–II' showing the third embodiment of the CPP-MR head of the present invention.

FIG. 4b shows a schematic cross-sectional view across of II–II' of FIG. 1 for the third embodiment of present invention. FIG. 4b shows the magnetic bias provided by permanent magnets 90a and 90b. The flux guide 30 or the free ferromagnetic layers 25 and 41 of the spin valves 20 and 40 are wider than other layers of the spin valve structure. The permanent magnets 90a and 90b are abutted with the flux guide layer 30, thereby suppressing Barkhausen noise and achieving improved linearity of the GMR element.

Figure 5A:
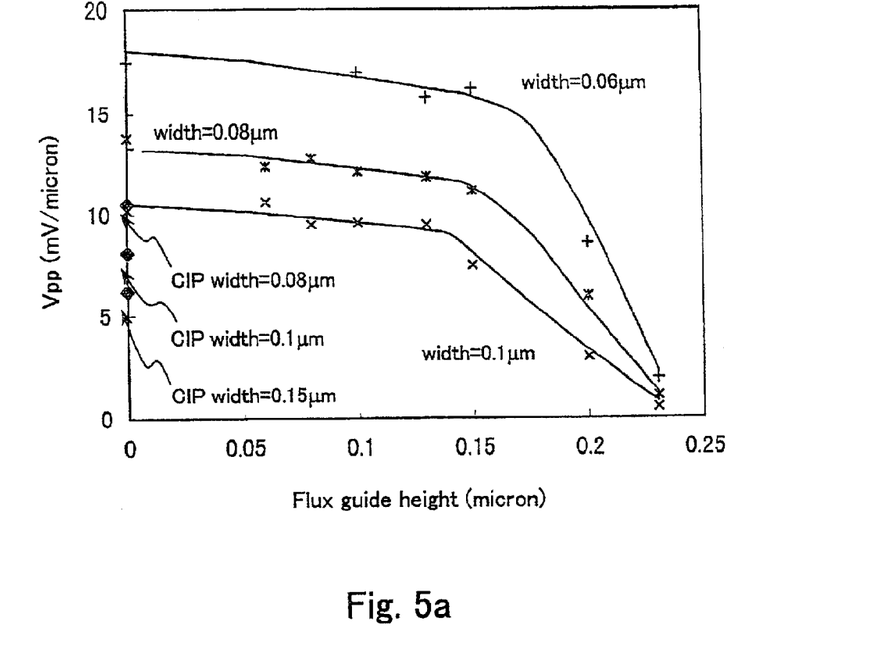
FIG. 5a is a graph showing output voltage versus the front flux guide height for a dual synthetic pinned spin valve with a structure of Ta3/PtMn15/CoFe2/Ru0.8/CoFe2.5/Cu2.4/CoFe1/NiFeTa3/CoFe1/Cu2.4/CoFe2.5/Ru0.8/CoFe2/PtMn15/Ta3 (wherein the numbers represent the respective layer thicknesses in nm) as compared with that of a conventional CIP geometry for a similar spin valve.

FIG. 5a plots the output voltage versus the front flux guide height for dual synthetic pinned spin valve with a structure of Ta3/PtMn15/CoFe2/Ru0.8/CoFe2.5/Cu2.4/ CoFe1/NiFeTa3/CoFe1/Cu2.4/CoFe2.5/Ru0.8/CoFe2/ PtMn15/Ta3 (wherein each number represents the thickness of the corresponding layer in nm) designed for an areal density over 100 Gbit/in$^2$, where the NiFeTa layer serves as the flux guide. The bias voltage is fixed at 100 mV for both the CPP-MR head of the present invention and the conventional CIP-MR head used for comparison. As shown, the output voltage decreases gently with flux guide height less than 0.12 μm, and then drops rapidly with further increase of the flux guide height. In small flux guide height range, the output voltage for CPP-MR heads are enhanced in comparison with that of CIP-MR heads with same spin valve structure.

Figure 5B:
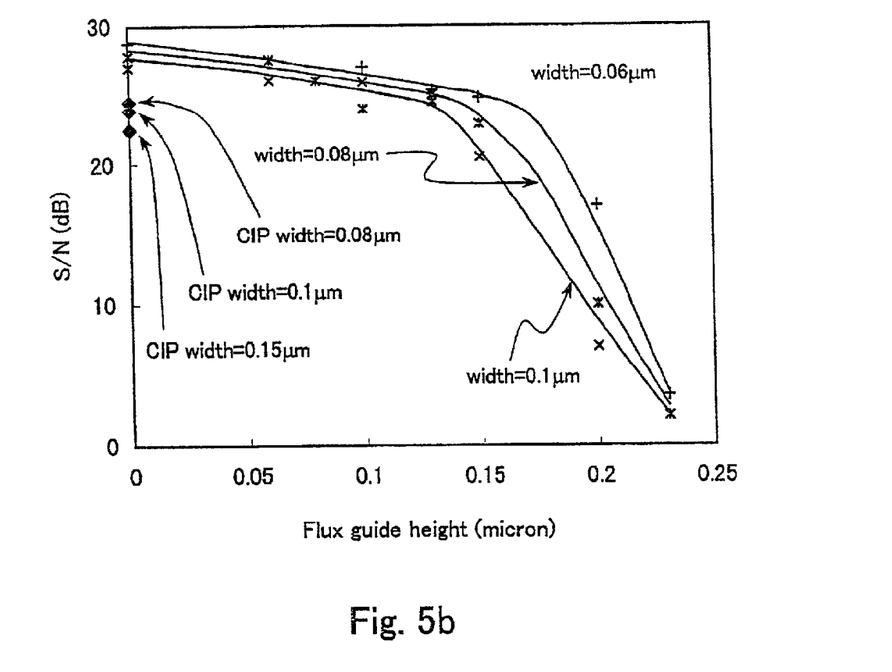
FIG. 5b is a graph showing signal-to-noise ratio S/N versus the front flux guide height for dual synthetic pinned spin valve with a structure of Ta3/PtMn15/CoFe2/Ru0.8/CoFe2.5/Cu2.4/CoFe1/NiFeTa3/CoFe1/Cu2.4/CoFe2.5/Ru0.8/CoFe2/PtMn15/Ta3 (wherein the numbers represent the respective layer thicknesses in nm) as compared with that of a conventional CIP geometry for a similar spin valve.

FIG. 5b depicts the signal-to-noise ratio S/N versus the front flux guide height for the same spin valve presented in FIG. 5a. With front flux guide height less than 0.12 μm, a S/N over 25 dB can be achieved, and is slightly larger than that of CIP-MR heads with same spin valve structure. Further increasing the front flux guide height over 0.12 μm, the S/N decreases dramatically. Thus as a result, in present invention, the front flux guide has to be less than 0.1 μm.

The magnetoresistance device according to the present invention comprises bottom and top magnetic shields that define the read gap and also act as electrical contact leads. The spin valve structure is disposed between the two magnetic shields and is magnetically separated but electrically contacted with the two magnetic shields. In accordance with the top type spin valve embodiment and the bottom type spin valve embodiment, the magnetoresistance device comprises a free ferromagnetic layer and a pinned layer separated by a spacer layer, such as Cu. The pinned layer is either a single ferromagnetic layer or a synthetic pinned ferromagnetic layer having two ferromagnetic layers antiferromagnetically coupled through a thin spacer layer of Ru. A flux guide made of low magnetic moment soft material contacts the free layer of the spin valve structure, thereby acting as part of the free layer. As a result of this design, a small read gap for the requirement of ultrahigh areal density can be achieved. With the dual spin valve (dual conventional or dual synthetic pinned) embodiment, the GMR element achieves a high output.

It will be apparent to those skilled in the art that various modifications and variations can be made in the magnetoresistance device of the present invention without departing from the spirit or scope of the invention. Thus, it is intended that the present invention cover the modifications and variations of this invention provided they come within the scope of the appended claims and their equivalents.

What is claimed is:

1. A current perpendicular-to-plane magnetoresistance (CPP-MR) device, comprising:

a first magnetic shield formed of an electrically conductive and magnetically shielding material;

a second magnetic shield formed of an electrically conductive and magnetically shielding material, the first and the second magnetic shields disposed to define a read gap therebetween; and a spin valve structure disposed between the first and second magnetic shields, the spin valve structure including a dual spin valve arrangement, the dual spin valve arrangement having first and second spin valves, wherein the first and second spin valves of the dual spin valve arrangement respectively have first and second free ferromagnetic layers, and wherein a flux guide directly contacts each of the first and second free ferromagnetic layers, thereby functioning as a free ferromagnetic layer of the spin valve structure.

2. The CPP-MR device according to claim 1, wherein each of the first and second spin valves of the dual spin valve arrangement includes a pinned layer having only one ferromagnetic layer.

3. The CPP-MR device according to claim 1, wherein each of the first and second spin valves of the dual spin valve arrangement includes a pinned layer having a synthetic pinned layer arrangement.

* * * * *